(12) United States Patent
Viswanathan (10) Patent No.: US 10,783,451 B2
(45) Date of Patent: Sep. 22, 2020

(54) ENSEMBLE MACHINE LEARNING FOR STRUCTURED AND UNSTRUCTURED DATA

(71) Applicant: ACCENTURE GLOBAL SOLUTIONS LIMITED, Dublin (IE)

(72) Inventor: Venkataraman Viswanathan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 682 days.

(21) Appl. No.: 15/443,463

(22) Filed: Feb. 27, 2017

(65) Prior Publication Data

US 2018/0101791 A1 Apr. 12, 2018

(30) Foreign Application Priority Data

Oct. 12, 2016 (IN) .............................. 201641034768

(51) Int. Cl.
*G06N 20/00* (2019.01)
(52) U.S. Cl.
CPC .................................... *G06N 20/00* (2019.01)
(58) Field of Classification Search
CPC ............................... G06N 20/00; G06N 20/20
See application file for complete search history.

(56) References Cited

U.S. PATENT DOCUMENTS

| | | | | |
|---|---|---|---|---|
| 7,660,793 | B2* | 2/2010 | Indeck | G06F 16/353 707/999.005 |
| 2008/0104542 | A1* | 5/2008 | Cohen | G06F 16/951 715/810 |
| 2012/0296891 | A1* | 11/2012 | Rangan | G06F 16/3347 707/722 |

OTHER PUBLICATIONS

Jurafsky, D., et al., "Chapter 4: N-Grams", 2014, in Speech and Language Processing book, chapter 4, 2014 (Year: 2014).*
Gaffar, Ashraf, etal.. "The Failure and Success of Unstructured Data Reuse a Pragmatic Analysis." The International Conference on Digital Information Processing, E-Business and Cloud Computing (DIPECC). Society of Digital Information and Wireless Communication, 2013. (Year: 2013).*

\* cited by examiner

*Primary Examiner* — Eric Nilsson
(74) *Attorney, Agent, or Firm* — Mannava & Kang, P.C.

(57) ABSTRACT

A machine learning system includes a data set processing subsystem to store data objects from multiple sources. An ensemble machine learning subsystem and a data search function may execute queries and identify related structured and unstructured data from the stored data objects. The structured and unstructured data may be used to create new data objects.

15 Claims, 10 Drawing Sheets

FORMS EXPLORER

LOGOUT
LOGGED IN: ADMIN accenture

| SEARCH FORMS | ADD FORMS | OPTIMIZER | VALIDATOR |

FORM NUMBER: [______]
BUSINESS TYPE: [ALL BUSINESS TYPES ▼]
LOB: [______ ▼]
FORM TYPE: [ALL FORM TYPES ▼]
SOURCE: [ALL SOURCES ▼]

VALID FROM: [MM/DD/YYYY 📅]
VALID TO: [MM/DD/YYYY 📅]
MULTISTATE: ○ YES ● NO
STATE: [______ ▼]

MANDATORY FORMS: [YES ▼]
FORM STATUS: [ACTIVE ▼]

[RESET] [SEARCH]

FORMS DETAILS

[DOWNLOAD PDF ⬇] [DOWNLOAD DOC ⬇] [EXPORT ⬇]

FORMS EXPLORER

LOGGED IN: ADMIN   LOGOUT

SEARCH FORMS | ADD FORMS | OPTIMIZER | VALIDATOR

FORM NUMBER
BUSINESS TYPE: ALL BUSINESS TYPES
LOB: ALL BUSINESS TYPES / ANNUITY / COMMERCIAL / LIFE / PERSONAL / SPECIALITY
FORM TYPE
SOURCE

VALID FROM: MM/DD/YYYY
VALID TO: MM/DD/YYYY
MULTISTATE: ○ YES ● NO
STATE

MANDATORY FORMS: YES
FORM STATUS: ACTIVE

RESET   SEARCH

FORMS DETAILS

DOWNLOAD PDF | DOWNLOAD DOC | EXPORT

FIG. 8

FIG. 9 accenture | OPTIMIZER | LOGGED IN: ADMIN | LOGOUT

SEARCH FORMS | ADD FORMS | OPTIMIZER | VALIDATOR

FORMS OPTIMIZER FUNCTIONALITY WILL HELP IN OPTIMIZING THE FORMS REPOSITORY TO DETECT AND ANALYZE REDUNDANT FORMS

WHAT PRODUCT ARE YOU LOOKING FOR FORMS RATIONALIZATION?*  [COMMERCIAL ▼]

WHICH LINE OF BUSINESS ARE YOU INTERESTED*  [COMMERCIAL AUTO ▼]

FOR WHICH INSURANCE FUNCTION DO YOU WISH TO DO FORM OPTIMIZATION*  [ALL FORM TYPES ▶]

WHAT SHOULD BE THE SOURCE OF FORMS
- ALL FORM TYPES
- SCHEDULE
- POLICY
- DECLARATIONS
- OTHER
- ENDORSEMENT
- COVERAGE
- POLICY WRITING
- POLICY WRITING SUPPORT FORMS

STATE

VALID FROM: [MM/DD/YYYY]
VALID TO:

[RESET] [CONTINUE]

REUSABLE INSURANCE OBJECTS

EXPAND ALL
▲ ACCOUNT
▲ PARTY
▲ POLICY INFORMATION
▲ RISK SCHEDULE
▲ POLICY COVERAGE
▲ LOCATION
▲ STATE DETAILS
▲ ROLES
▲ DRIVER SCHEDULE
▲ ENDORSEMENT
▲ ADDITIONAL INTERESTS
▲ POLICY PRICING
▲ REINSURANCE
▲ UNDERWRITING ADDITIONAL INFORMATION
▲ USERS
▲ ENTITY

FIG. 10

ENSEMBLE MACHINE LEARNING FOR STRUCTURED AND UNSTRUCTURED DATA

PRIORITY

The present application claims priority under 35 U.S.C. 119(a)-(d) to Indian patent application serial number 201641034768 filed on Oct. 12, 2016, which is incorporated by reference in its entirety.

TECHNICAL FIELD

Embodiments and examples of the present application are directed to artificial intelligence type computers and digital data processing systems and corresponding data processing methods and products for emulation of intelligence. The embodiments and examples include supervised machine learning classifiers and unsupervised machine learning functions.

BACKGROUND

Machine learning evolved from the study of pattern recognition and computational learning theory in artificial intelligence. Machine learning explores the study and construction of algorithms that can learn from and make predictions on data. Such algorithms operate by building a machine-implemented model from example inputs in order to make data-driven predictions or decisions rather than following strictly static program instructions.

One type of machine learning involves supervised learning based on a training set as part of a classification process. The classification process involves trying to predict results in a discrete output. In other words, predictions are made for mapping input variables into discrete categories. Examples of machine learning algorithms used for classification include the well-known Naïve Bayes and C4.5 algorithms, or a so-called "stacked" combination of two or more such algorithms. In supervised learning, the machine learning algorithm examines an input training set, and the computer 'learns' or generates a classifier, which is able to classify a new document or another data object under one or more categories. In other words, the machine learns to predict whether a document or another type of data object, usually provided in the form of a vector of predetermined attributes describing the document or data object, belongs to a category. When a classifier is being trained, classifier parameters for classifying objects are determined by examining data objects in the training set that have been assigned labels indicating to which category each object in the training set belongs. After the classifier is trained, the classifier's goal is to predict to which category an object provided to the classifier for classification belongs.

Unsupervised learning approaches problems with little or no idea what results should look like. There is no feedback based on the prediction results because there is no training set. With unsupervised learning, relationships between variables in a data set may be determined to make predictions.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the examples. Furthermore, the examples may be used together in various combinations.

According to examples of the present disclosure, a combination of unsupervised and supervised machine learning are used for query execution and for determining similarities and making predictions based on a set of documents. For example, in a first phase, unsupervised learning may be used to execute a query on a corpus of documents. A technical problem associated with query execution is that words in a query may not be in an index created for a set of documents being searched. For example, a searcher may be searching by concept which can be described using words other than provided in the index. Also, words may have multiple meanings so word match may not match the concept being searched. As a result, a search based on concept may not return relevant documents, or words with double meanings may return documents that are irrelevant.

According to an example of the present disclosure, in a first phase, machine learning functions for natural language processing may be used to search a set of documents. Latent semantic indexing (LSI) may be implemented to determine relationships between the set of documents and the terms they contain. A set of concepts described in the set of documents and their terms is determined, and a matrix of term-document association data is created from the set of documents. LSI includes applying singular-value decomposition (SVD) to the matrix of term-document association data. A semantic space may be constructed including the terms and documents from the matrix. SVD arranges the semantic space so documents that are determined to be associated based on patterns are clustered. Executing a search may include using terms in a query to identify a point in the semantic space, and documents that are within a predetermined distance are retrieved. In the first phase, unstructured text in the set of documents may be searched based on the query to retrieve the most similar documents (e.g., closest in the semantic space). LSI may be used to reduce the dimensionality of a set of points in the semantic space and used to search the set of documents to find matches. This natural language processing may be repeated as new documents are received that are to be included in the set of documents to be searched. Also, searches may be executed on the unstructured text of the set of documents to identify matches.

In an example, in the first phase, the natural language processing may be used to search a set of documents to create a new document. For example, the query that is executed to search the set of documents in the first phase may include terms related to a type and content of a new document to be created.

In a second phase, from the document matches determined from the first phase, a search of structured data in the matching documents is performed to identify reusable objects. For example, the matches from the first phase may include the closest matching documents to the query. Closest matching documents may be determined based on a threshold. In an example, the threshold may be based on a predetermined integer "k" greater than 0. For example, the top k documents matching the query are retrieved, whereby k=100. In another example, the threshold may be a predetermined distance from the point in the semantic space representing the query. From the set of matching documents, in the second phase, structured data is determined. For example, the matching documents may include structured data in fields. The fields are retrieved. Fields that are in a plurality of the matching documents may be identified in the second phase. In an example, all the fields from the set of matching documents may be identified or a subset of the fields that are common among the set of matching documents are retrieved. In an example, document schemas of the set of matching documents may be parsed to identify the fields from the set of matching documents. In an example, MongoDB®, which is an open source database, may be used to identify fields from the set of matching documents.

The fields identified in the second phase may be reusable objects that may be used to create a new document based on the query executed in the first phase. For example, one or more of the identified fields may be selected and included in a new document being created.

In a third phase, supervised machine learning may be performed to identify unstructured data matches from the set of matching documents determined in the first phase. In an example, a training set is generated to train a classifier to classify the unstructured data. The training set may include sentences comprised of a list of words and labels. A supervised machine learning function according to an example of the present disclosure may iterate through the sentences twice. In a first iteration, the vocabulary for the sentences is learned. In a second iteration, the classifier is trained. For example, a vector representation for each word and for each label is generated from the training set. Once the classifier is trained, unstructured data may be classified by the classifier according to the categories (e.g., labels) in the training set. In an example, the "distributed memory" (dm) or the "distributed bag of words" (dbow) machine learning functions may be used.

In the third phase, the unstructured data from the set of matching documents determined in the first phase may be searched to identify unstructured data belonging to a particular category. This unstructured data may be included in the new document being created along with reusable objects identified in the second phase. In an example, a reusable object determined from the second phase is a category, and unstructured data from the set of matching documents that is determined by the classifier to belong to the category of the reusable object is included in the new document being created.

A technical problem associated with machine learning is the accuracy of predictions. False predictions made by a machine learning function ultimately negatively impacts the use of the machine learning function for its particular application. As is discussed above and as is further discussed below, a system according to an example of the present disclosure may use an ensemble machine learning function which may improve predictive performance. For example, the ensemble machine learning function includes multiple machine learning functions comprised of supervised machine learning and unsupervised machine functions. The ensemble machine learning function may determine similarities between structured and unstructured data from a corpus of documents. A new document may be generated based on the similarities and predictions made by the ensemble machine learning function.

Figure 1:
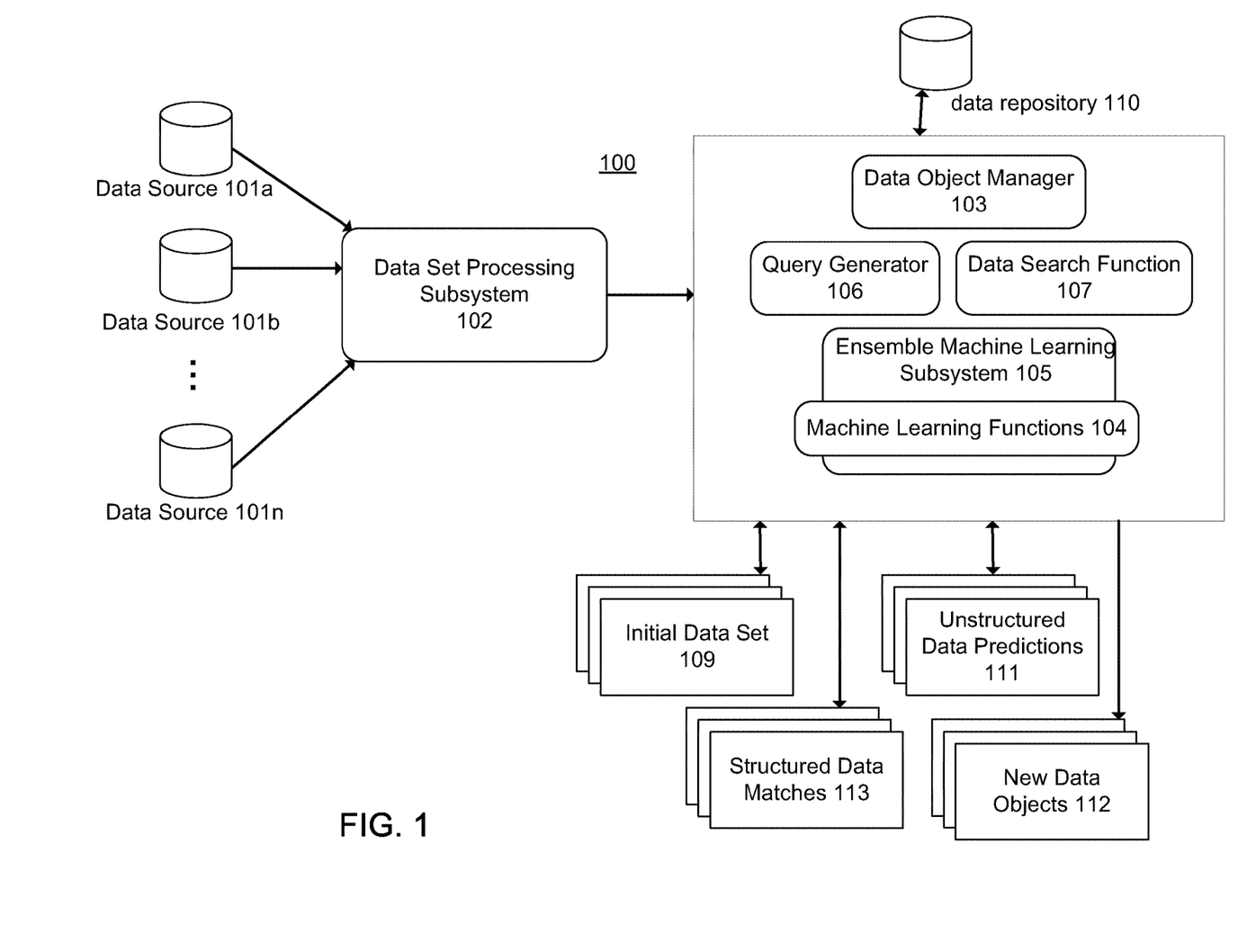
FIG. 1 illustrates a machine learning system, according to an example.

FIG. 1 illustrates a machine learning system 100, according to an embodiment. A data set processing subsystem 102 processes data from data sources 101*a-n*. The data set processing subsystem 102 may perform translations operations for structured data provided from the data sources 101*a-n*. The data set processing subsystem 102 may also receive unstructured data from the data sources 101*a-n*. Data object manager 103 may store the data received from the data sources 101*a-n*, which may include structured and unstructured data and which may be processed by the data set processing subsystem 102, in data repository 110.

The information received from the data sources 101 may include data objects (also referred to as objects). A data object, for example, may be information to be processed by ensemble machine learning subsystem 105 or may be information that can be used for operations performed by the ensemble machine learning subsystem 105, such as metadata describing a data object. A data object may include metadata such as a vector of variables (also referred to as attributes), and a value for each variable that describes the data object. Examples of data objects can include, but are not limited to, numbers, files, images, documents, etc.

By way of example, data objects received from the data sources 101*a-n* include documents comprised of structured and unstructured data. Structured data refers to information that is organized, such as fields in a document or a database. The organization of the structured data may allow the data to be readily searched. The structured data may be organized according to a predetermined data model. Unstructured data may not be organized according to a predetermined data model. Unstructured data is commonly text but may include other types of information.

A query generator 106 may generate a query based on user input to search for data objects in the data repository 110. Ensemble machine learning subsystem 105 includes multiple machine learning functions 104 to search for structured and unstructured data and to make predictions for structured and unstructured data. For example, machine learning functions for natural language processing may be performed by the ensemble machine learning subsystem 105 to search for data objects from the data repository 110 matching a query generated by the query generator 106. For example, the machine learning functions 104 may include natural language processing functions to create a semantic search space of the objects in the data repository 110 and to search the semantic space to identify the closest matching objects to the query. An initial data set 109 is created from the search results of the closest matching objects. The data search function 107 may identify matching structured data 113 from the initial data set 109, and machine learning functions 104 may make unstructured data predictions 111 on the initial data set 109. The matching structured data 113 may include matches of structured data determined from data objects selected from the initial data set 109. The unstructured data predictions 111 may include matches of unstructured data determined from unstructured data selected from the initial data set 109. Based on the matching structured data 113 and the unstructured data predictions 111, new data objects 112 may be created as is further discussed below.

Figure 2:
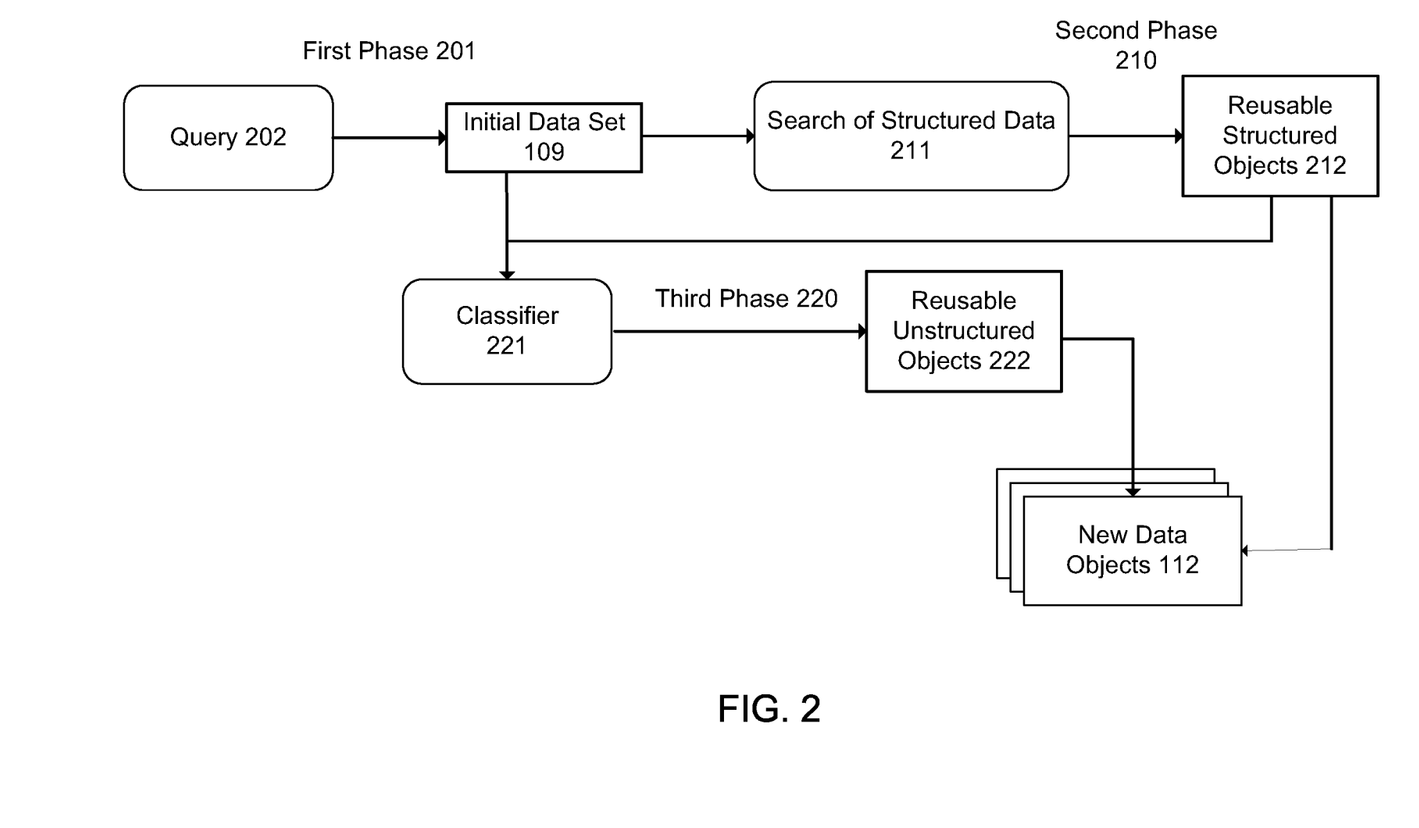
FIG. 2 illustrates a data flow diagram, according to an example.

FIG. 2 shows an example of different phases for object matching and object creating which may be performed by the system 100. In a first phase 201, a query 202 is generated for example based on user input or input provided by another system. The query may include search terms. The search terms may include text. Natural language processing functions from the machine learning functions 104 may be used to determine the initial data set 109, which are the query search results. For example, the data objects are documents, and attributes of the data objects may be terms in the documents. LSI may be implemented to determine relationships between the set of documents and the terms they contain.

LSI uses SVD to break a matrix of document terms into a set of three matrices to create a semantic space that is searchable to run queries. LSI reduces the dimensionality of the semantic space while simultaneously revealing latent concepts that are implemented in the underlying corpus of applications. In LSI, terms are elevated to a semantic space, and terms that are used in similar contexts are considered similar even if they are spelled differently. Thus, LSI makes embedded concepts explicit. SVD is a form of factor analysis used to reduce dimensionality of the semantic space to capture most essential semantic information about the terms and documents. SVD can be viewed as a method for rotating the coordinate axes of the k-dimensional space to align these axes along the directions of largest variations among the documents. As a result, LSI offers a way of assessing semantic similarity between any two samples of some text.

For example, a set of concepts related to documents and their terms are determined, and a matrix of term-document association data is created from a set of documents to be searched. For example, a term-document matrix may include an M×N matrix whereby each row represents a term and each column represents a document. Depending on the number of documents, the matrix may have tens or hundreds of thousands of rows and columns. SVD may be applied to the M×N term-document matrix to create a reduced dimensionality semantic space with respect to the M×N term-document matrix. SVD is a known linear algebra technique that determines a factorization of a matrix, such as the M×N term-document matrix. The SVD of the M×N term-document matrix reduces the number of rows while preserving the similarity structure among columns of the matrix. In an example, the SVD may be computed using a PYTHON® programming language SVD program (scipy.numpy.linalg).

SVD decomposes the M×N term-document matrix into the product of three other matrices. One component matrix describes the original row entities as vectors of derived orthogonal factor values, another describes the original column entities in the same way, and the third is a diagonal matrix containing scaling values such that when the three components are matrix-multiplied, the original matrix is reconstructed. For example, the output of the SVD includes three matrices, U, S and V. That is the singular value decomposition of the M×N term-document matrix is a factorization such that the SVD of A (where A is the M×N term-document matrix) is $U*S*V'$. U is an M×M matrix. V is an N×N matrix. S is a diagonal matrix of singular values.

In an example, all but the k highest singular values (where the k highest singular values may be determined according to a predetermined threshold) may be set to 0, whereby k is a parameter that is tuned based on the search space being created. For example, low values of k may result in poor accuracy of search results, but high values of k may not change the results much from a word match search. Setting all but the k highest singular values to 0 makes a new matrix, S'. A reduced dimensional semantic space is created from S'. Thus, SVD of the M×N term-document matrix may be used to create a reduced-dimensional searchable semantic space whereby documents that are determined to be associated based on patterns are clustered. Words may be compared by taking the cosine of the angle between two vectors (or the dot product between the normalizations of the two vectors) formed by any two rows in the semantic space. Values close to 1 represent very similar words while values close to 0 represent very dissimilar words. Executing a search may include using terms in the query 202 to identify a point in the semantic space, and documents that are within a predetermined distance are retrieved. In the first phase 201, unstructured text in the set of documents may be searched based on the query to retrieve the most similar documents (e.g., closest in the semantic space). In an example, a combination of LSI, latent Dirichlet allocation and random projections may be used to reduce the dimensionality of a set of points in the semantic space to search the set of documents to find matches. The natural language processing described above to create the semantic search space may be repeated as new documents are received that are to be included in the set of documents to be searched. The structured and unstructured data in the data objects may be searched to identify the objects for the initial data set 109.

In a second phase 210, a search of structured data 211 from the initial data set 109 is performed to identify reusable structured objects 212. For example, the initial data set 109 may include documents including structured data in fields. The fields are retrieved. Fields that are in a plurality of the matching documents may be identified in the second phase 210. In an example, all the fields from the set of matching documents may be identified or a subset of the fields that are common among the set of matching documents are retrieved. In an example, document schemas of the set of matching documents may be parsed to identify the fields from the set of matching documents. In an example, MongoDB®, which is an open source database, may be used to identify fields from the set of matching documents.

In a third phase 220, a supervised machine learning function of the machine learning functions 104 may be used to identify unstructured data matches from the initial data set 109. In an example, a training set is generated to classify the unstructured data. A classifier 221 is generated from the supervised machine learning function trained from the training set. The training set may include sentences comprised of a list of words and labels. For example, the supervised machine learning function iterates through the sentences twice. In a first iteration, the vocabulary for the sentences is learned. In a second iteration, the classifier is trained. For example, a vector representation for each word and for each label is generated from the training set. Once the classifier 221 is trained, unstructured data from the initial data set 109 may be classified by the classifier 221 according to the categories (e.g., labels) in the training set to identify reusable unstructured objects 222. In an example, a reusable structured object from the reusable structured objects 212 may belong to a particular category, and the classifier 221 identifies unstructured data from the initial data set 109 that belongs to the category. In an example, the category may be a type of provision in an insurance form, such as payment provisions, coverage provisions, etc. The provisions may be paragraphs in the forms. The categories may specify the types of provisions. A category may be associated with selected structured objects, such as particular fields. One or multiple classifiers may be created for the classifier 221 to classify text from documents as belonging to particular categories.

The system 100 may generate the new data objects 112 from the reusable structured objects 212 and the reusable unstructured objects 222. The new data objects 112 may include new documents. For example, fields from the initial data set 109 are included in the reusable structured objects 212, and one or more of the fields are included in a new document. Also, the reusable structured objects 212 may include text from the initial data set 109. The text may include text associated with the fields of the reusable structured objects 212. The test may be included in the new document.

Figure 3:
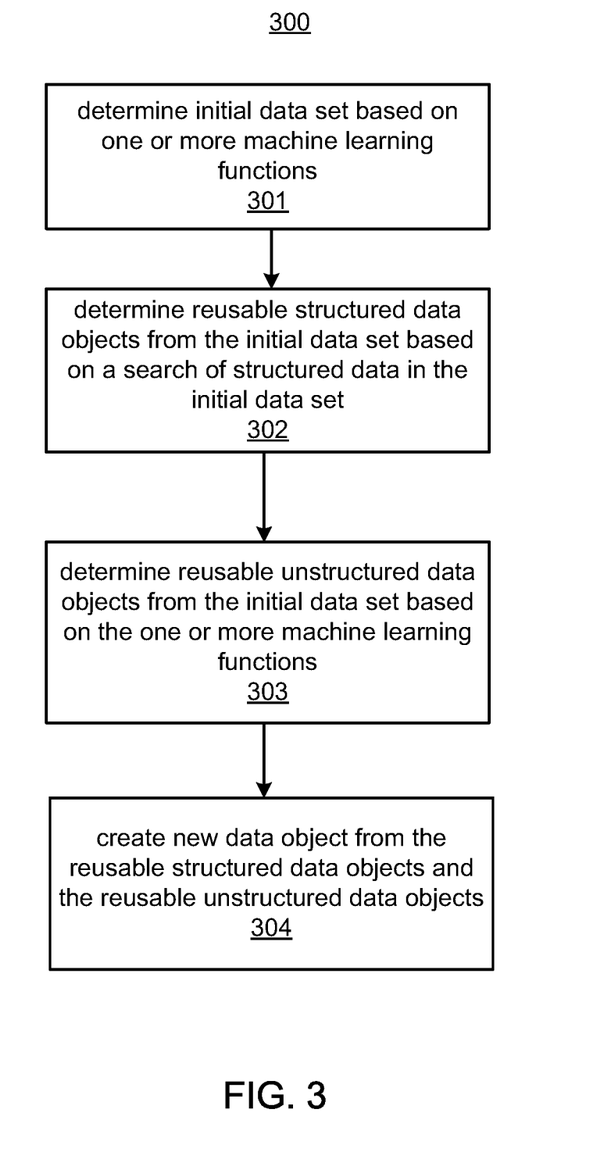
FIG. 3 illustrates a method to create a new data object, according to an example.

FIG. 3 illustrates a method 300 according to an example of the present disclosure. The method 300 may be performed by the system 100. At 301, the initial data set 109 is determined, for example, based on one or more of the machine learning functions 104. At 302, reusable structured data objects 212 are determined from the initial data set 109 based on a search of structured data in the initial data set 109. At 303, reusable unstructured data objects 222 are determined from the initial data set 109 based on the one or more of the machine learning functions 104. At 304, a new data object is created from the reusable structured data objects 212 and the reusable unstructured data objects 222.

Figure 4A:
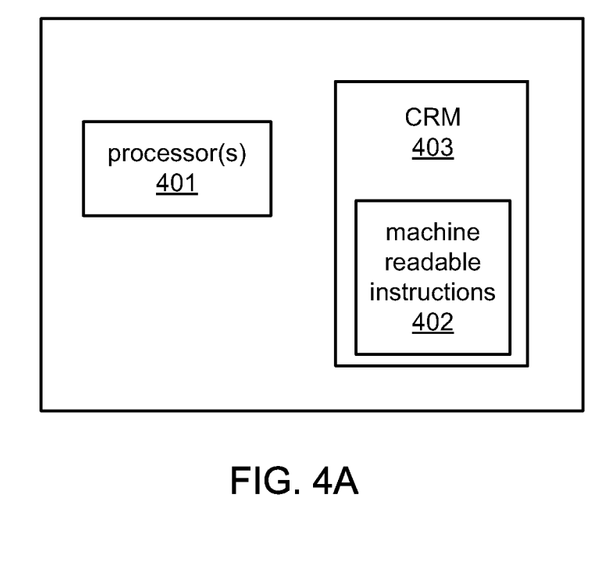
FIGS. 4A-B illustrate hardware for a machine learning system, according to examples.
Figure 4B:
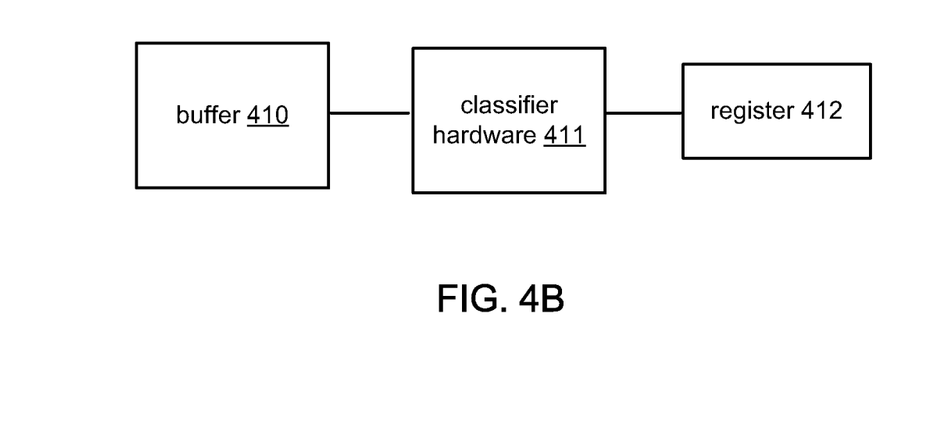

FIG. 4A illustrates an example of a computing hardware configuration for the system 100. Although not shown additional hardware components may be used for the system 100. One or more processors 401 may execute machine readable instructions 402 stored in a non-transitory computer readable medium 403 to perform the operations of system 100. Classifiers and machine learning functions 104 and data search function 107 of the system 100 may be executed by one or more of the processors 401 or other hardware. FIG. 4B shows an example of hardware for any of the classifiers or functions discussed above. A buffer 410 holds data objects to be processed or classified by a classifier. The data objects may be provided from a training set if the classifier is being trained or a validation set if being tested. Hardware 411, such as a processor of the processors 401, or a field programmable gate array, or other hardware executes one or more of the functions discussed above to classify or process data objects in the buffer 410. The results may be stored in register 412, which may be a "1" or a "0" for a binary classification of whether a data object input to the classifier belongs to a particular category, or other values, depending on the processing being performed.

Figure 5:
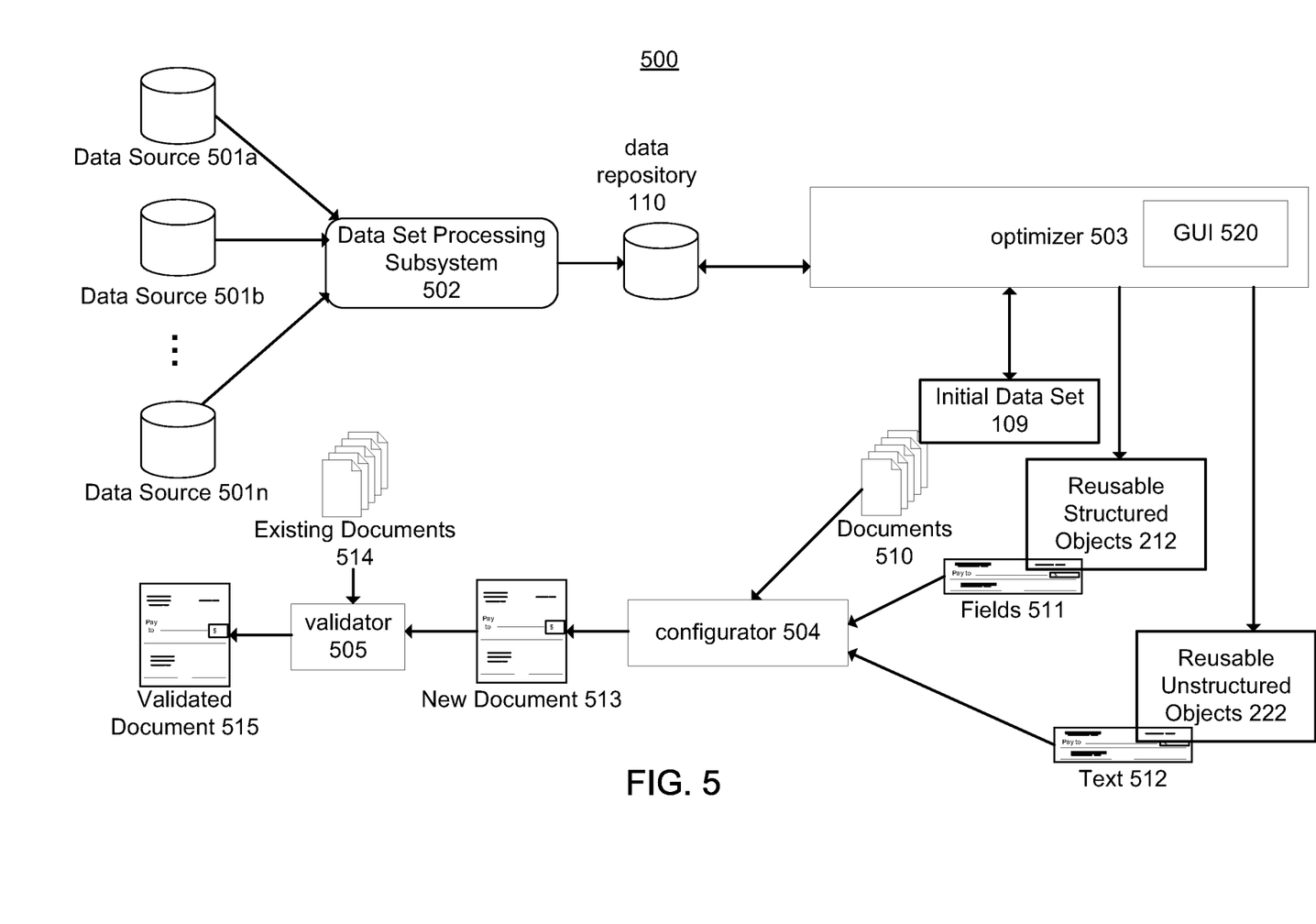
FIG. 5 illustrates a machine learning system, according to another example.

The system 100 discussed above may be used to generate new documents based on existing documents. FIG. 5 shows a system 500 which is an embodiment of the system 100. The system 500 can generate new documents based on existing documents. The data sources 501 may include applications or other types of data sources. Application program interfaces or other connection mechanisms may be used to trigger transmission of documents from the data sources 501 to the system 500. The data set processing subsystem 502 may include data conversion and translation services to translate and convert data from the documents based on formatting and transformation rules and store the data from the received documents in a database or other storage system, such as the data repository 110 shown in FIG. 1. The optimizer 503 performs the operations described with respect to FIGS. 1-3. For example, the optimizer 503 may execute a query, including performing natural language processing functions of the machine learning functions 104, to identify the initial data set 109. The initial data set 109 may include documents 510, which may be stored in the data repository 110 shown in FIG. 1, and which may include documents from the data sources 501. In the second phase 210, the optimizer 503 analyzes the documents 510 from the initial data set 109, for example by the data search function 107 shown in FIG. 1, to identify the reusable structured objects 212 shown in FIG. 2. The reusable structured objects 212 may include fields 511 from the documents 510 in the initial data set 109. In the third phase 220, the optimizer 503 analyzes the documents from the initial data set 109, for example by the data search function 107 shown in FIG. 1, to identify reusable unstructured objects 222 shown in FIG. 2. The reusable unstructured objects 222 may include text 512 from the documents 510 in the initial data set 109. The configurator 504 may include a graphical user interface to present the reusable structured objects 212 and the reusable unstructured objects 222 for creating a new document 513. The new document 513 being created may be a form that is being created from other forms that are stored in the data repository 110. A validator 505 can validated the new document 513 by comparing it to one or more existing documents 514. For example, if the new document 513 is an insurance form, the new insurance form can be compared to another insurance form to determine whether the form has all the needed fields and text, which may include fields and text required by industry regulations and laws. In another example, a form may be go through a conversion process to create a new form. The validator 505 can compare the new form to one or more old forms to determine whether the new form has all the fields and text of the old form. If the new form does not have all the needed fields and text, the validator 505 may add those fields and text to the new document 513 to create the validated document 515. The system 500 can generate through a user interface an indication of whether the new form includes all the fields and text of the old form.

Figure 6:
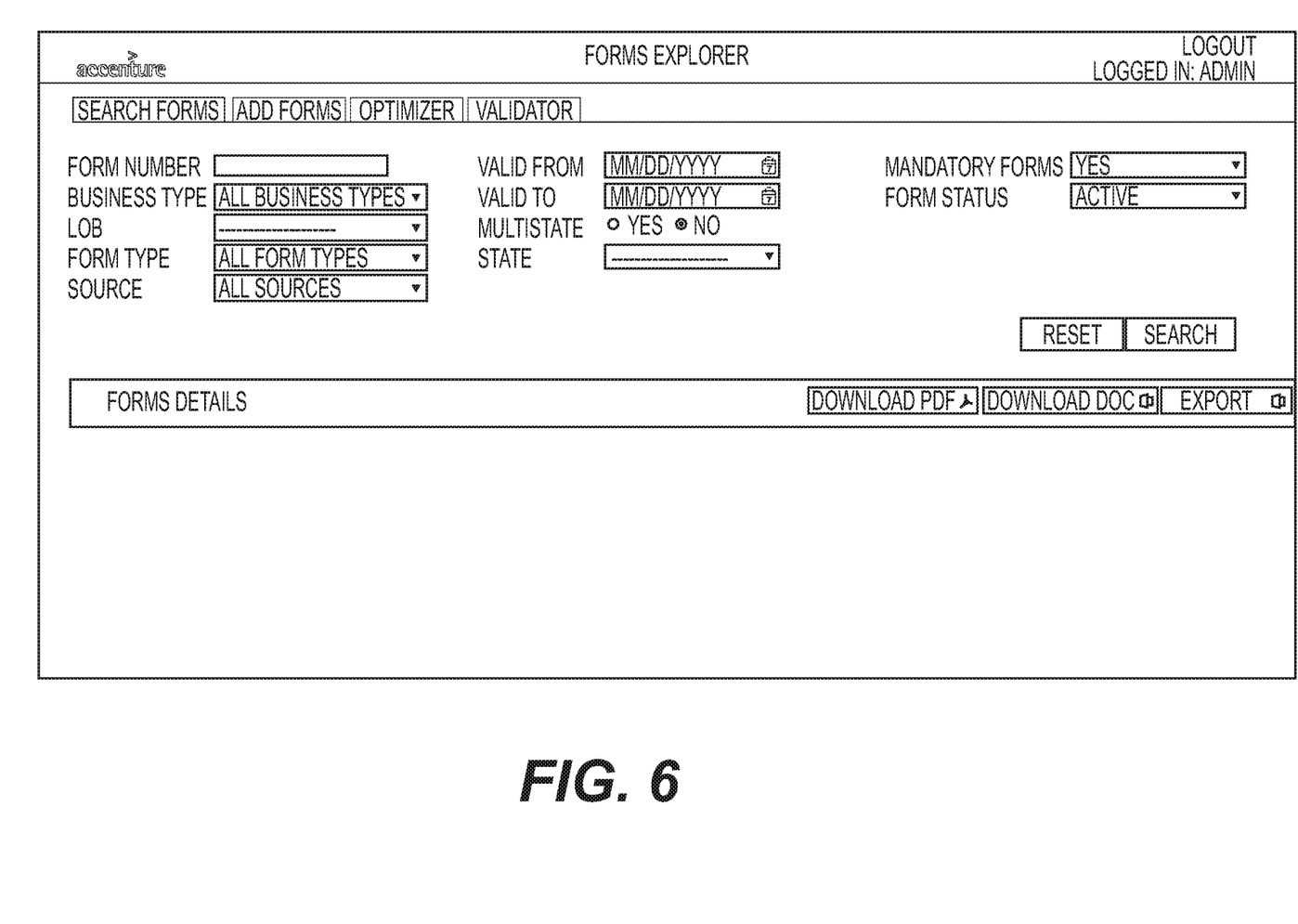
FIGS. 6-10 illustrate examples of screen shots generated by a graphical user interface of the machine learning systems, according to examples.
Figure 7:
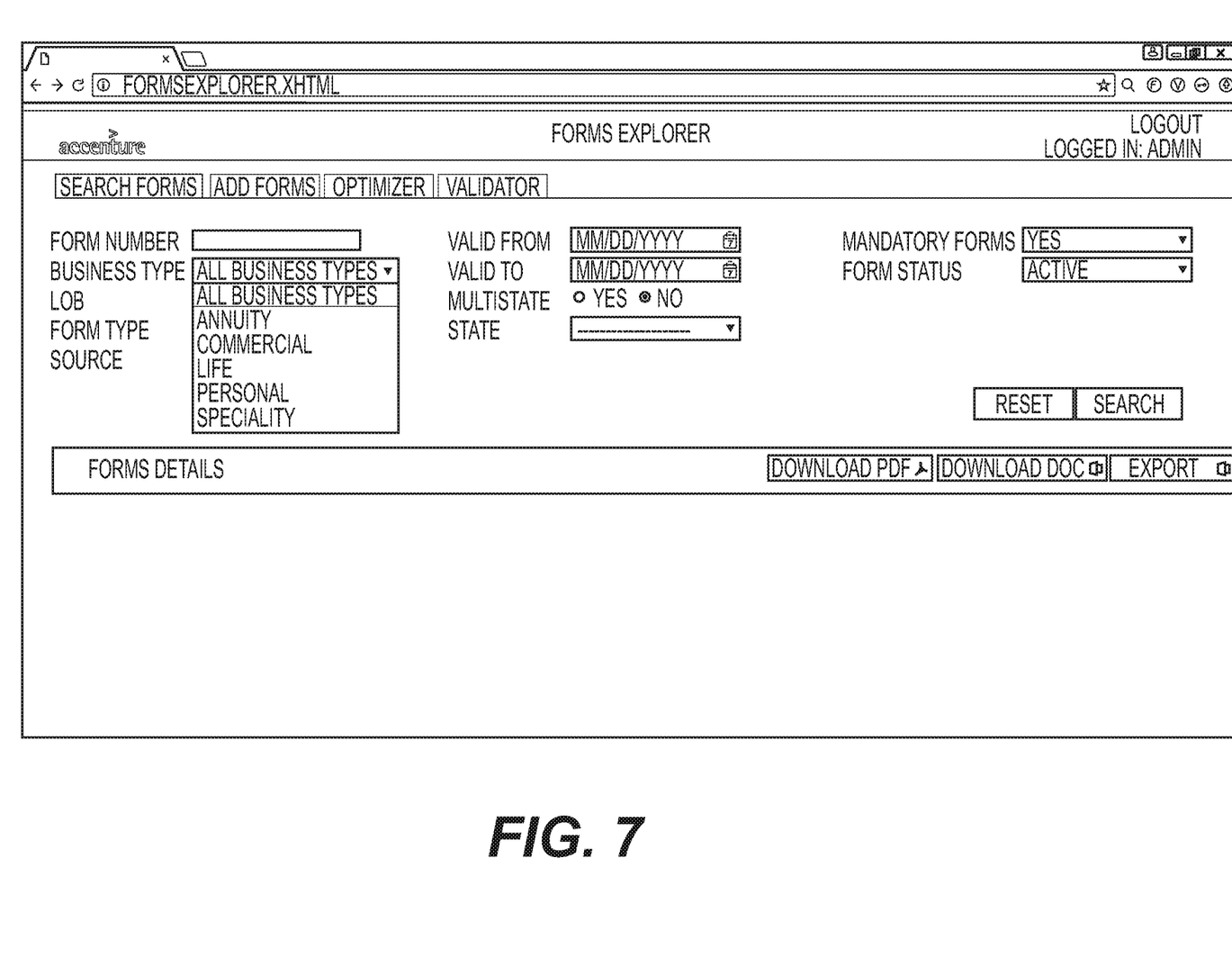

FIGS. 6-10 show examples of screenshots of a graphical user interface (GUI) of the system 100 and/or the system 500. For example, the optimizer 503 may generate a GUI 520 shown in FIG. 5 and the figures described below. FIGS. 6-7 show examples of searching for documents in the data repository 110 through the GUI 520. The documents may be forms or other types of documents. The query 202 used to generate the initial data set 109, described above, may include a query generated through the GUI 520, such as shown in FIGS. 6 and 7. The query 202 may be generated to search the forms. The query 202 may include information such as form number, business type, dates the form is valid and other parameters. Other parameters may also be included. Also, free form text may be entered to search for a document. The parameters or text are included in as search terms in the query. FIGS. 6 and 7 show examples of parameters that may be selected for the query 202. For example, FIG. 6 shows query parameters that may include form number, business type, form type, etc. Also, a date range may be selected, such as a date range specifying when a form is valid. Geographic location may be selected, such as forms for a particular state. The status and whether a form is mandatory may be selected for the query 202. FIG. 7 shows examples of the different business types that may be selected, such as annuity, commercial, life, etc. For example, if the stored documents are insurance forms, the type of forms may be selected. After the search button is selected, search results may be displayed in a window (not shown) in the GUI 520, and a document from the search results may be selected for viewing.

Figure 8:
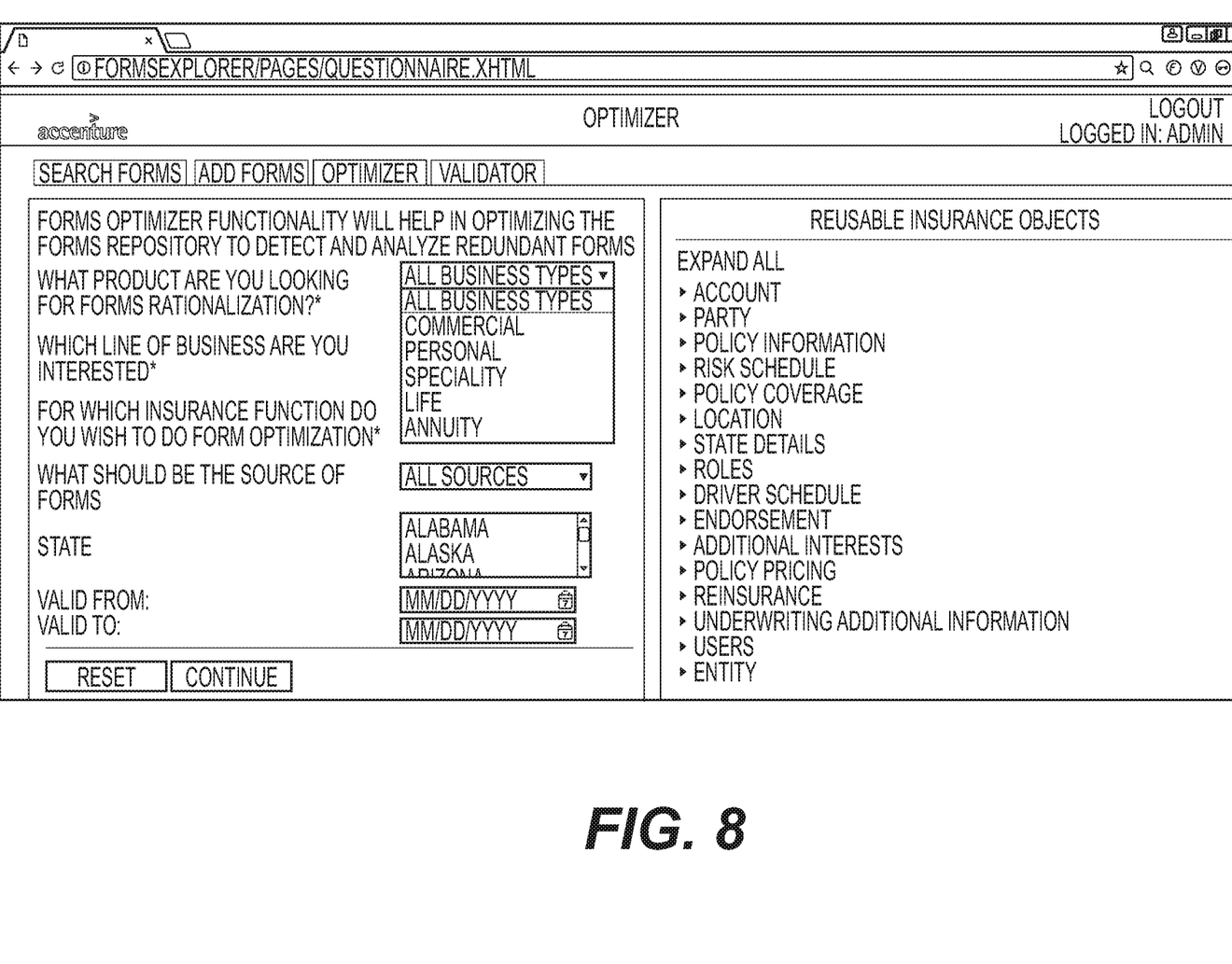
Figure 9:
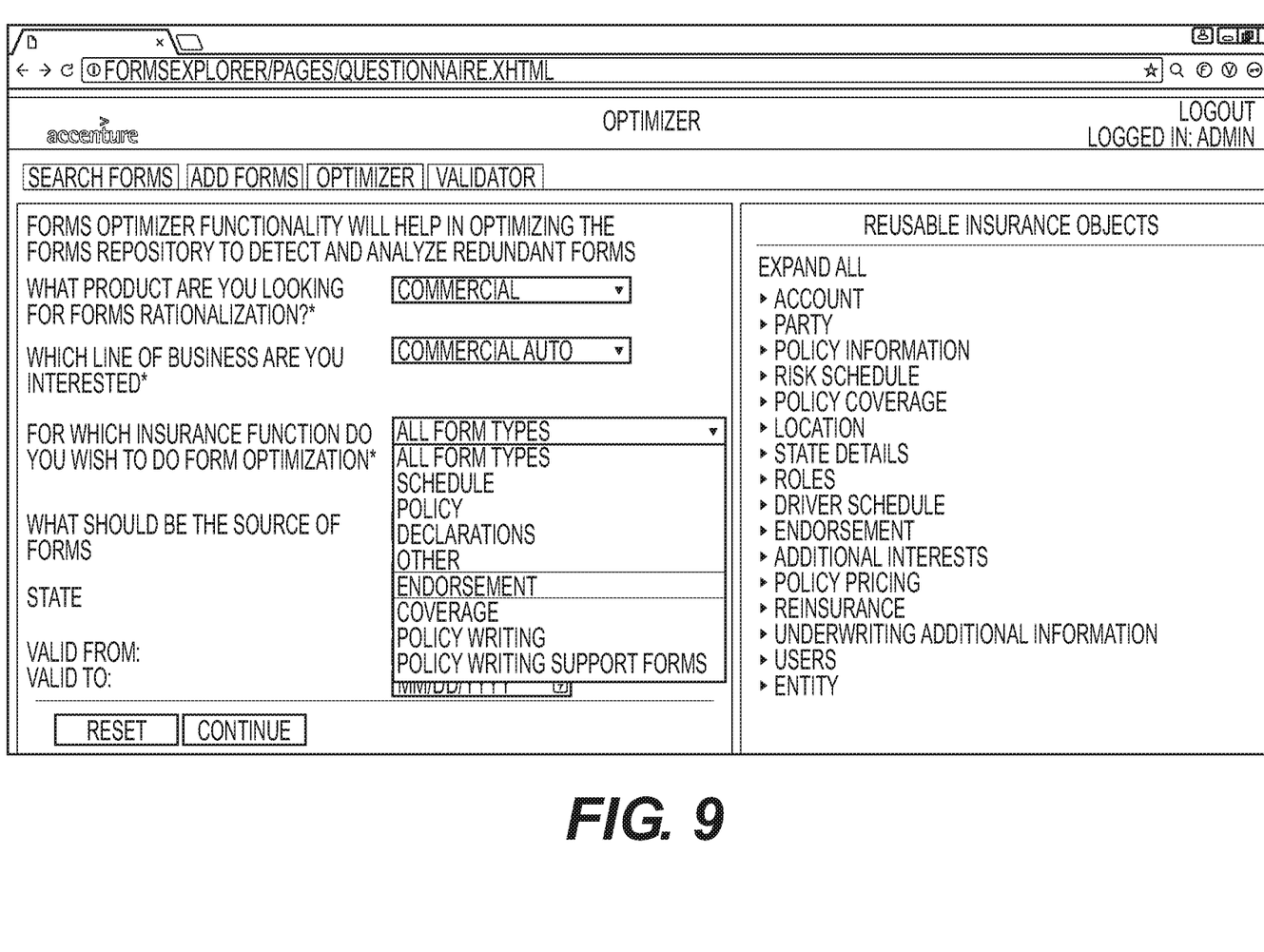
Figure 10:
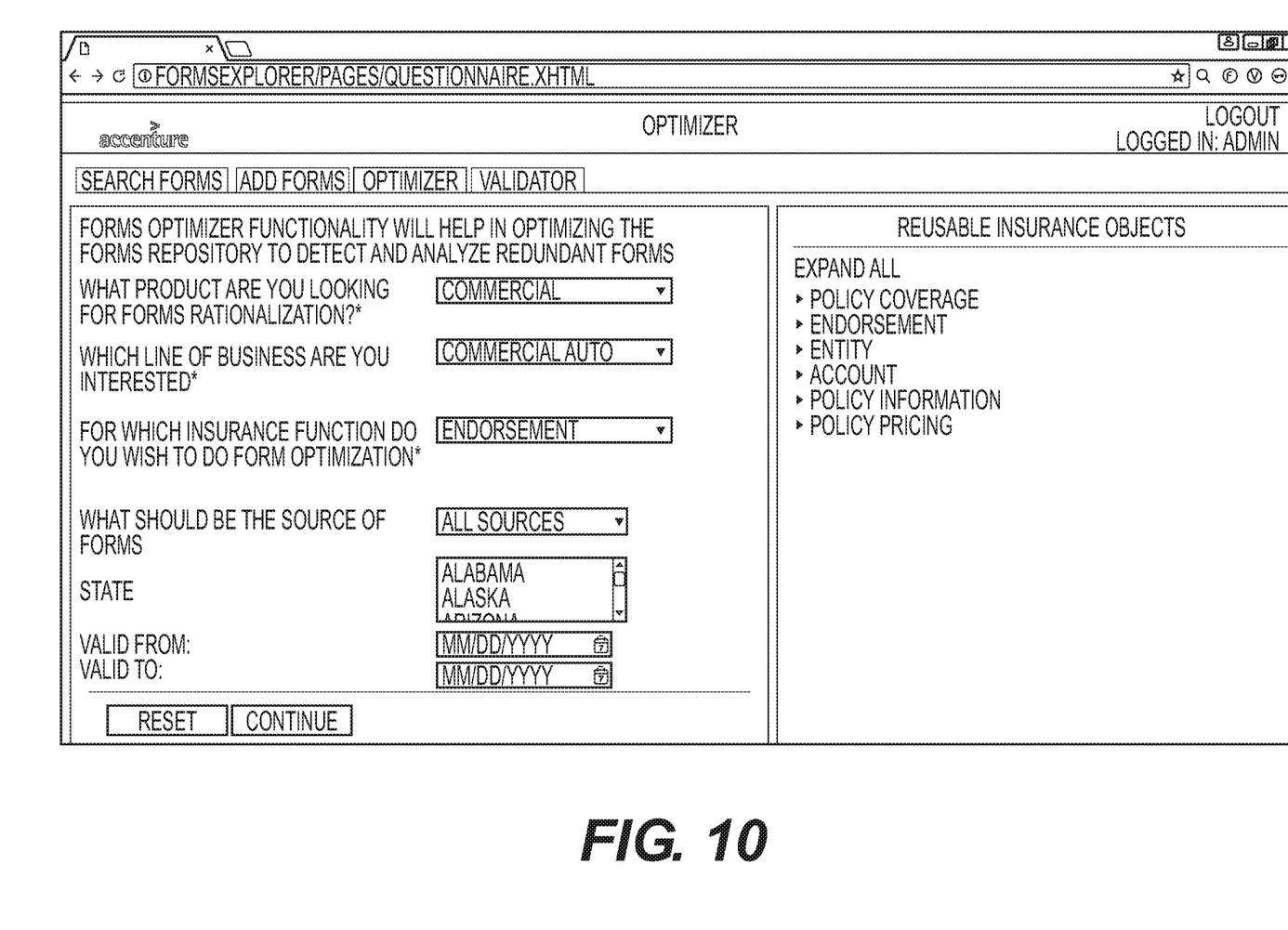

FIGS. 8-10 show additional examples of screen shots for creating a new document. The optimizer 503 may perform one or more of the steps to create the new document. The screen shots may be in the GUI 520. In FIG. 8, parameters may be selected for the query 202 to search documents, such as forms, to create the initial data set 109. For example, as shown in the left side of FIG. 8, search parameters for the query 202 that may be selected can include product or business type, line of business, function, sources, state, dates, etc. Also, free form text may be entered in the text box for the query 202. The optimizer may identify reusable structured objects 212 and reusable unstructured objects 222 from the forms in the initial data set 109, which includes forms from the search results of the query 202. The right side of FIG. 8 shows examples of the identified reusable structured objects 212. For example, the reusable structured objects 212 may be fields in the forms the initial data set 109, such as account, party, policy information, etc. The fields may include headers or section titles in insurance forms. The fields may include some boiler plate text associated with each header or section. One or more of the fields may be selected to create a new form. Although not shown, the reusable unstructured objects 222 may also be identified by the optimizer 503, such as through the third phase 220 described with respect to FIG. 2. The reusable unstructured objects 222 may include unstructured text that may be identified from the forms the initial data set 109, which may include text that is not in fields in a form. The unstructured text may include text in insurance forms that may belong to a particular category, such as text that describe different types of provisions in insurance policies. In an example, the GUI 520 may display the identified unstructured text that belong to one or more categories that are identified by the classifier 221 and a user may select which unstructured text to include in the new document. The new document may be created from the selected fields and unstructured text and validated by the optimizer 503.

FIGS. 9-10 also show additional examples of parameters for the query 202. Referring to FIG. 9, additional examples of parameters for the query 202 are shown. For example, the product may be selected as "commercial", and the line of business may be "commercial auto". Also, a function may be selected, such as endorsement. FIG. 10 shows that a source may be selected, such as one or more of the data sources 101, and a state may be selected. The right side of FIG. 10 also shows that the identified reusable structured objects 212 may change as result of selecting different search parameters from that of shown in FIG. 8. In an example, a score may be generated for each matching document in the initial data set 109 to indicate the level of matching with the query 202, and the scored matching documents may be displayed in a result view window (not shown).

As discussed above, although not shown, reusable unstructured objects for one or more of the structured objects may be found through the machine learning functions 104, and the reusable unstructured objects may be displayed for selection. For example, if a new document is being created, reusable structured objects (e.g., reusable structured objects 212) and corresponding reusable unstructured objects (e.g., reusable unstructured objects 222) may be displayed through the GUI 520. A user may select one or more of the reusable structured objects and reusable unstructured objects for inclusion in the new document. An editor may be displayed to create the new document. A document of matching documents from the results of query 202 may be selected through the graphical user interface, and reusable structured objects from the document or other documents may be selected or automatically included in the document editor for creating the new document. Reusable unstructured objects related to a structured object, such as policy information or policy number, may be identified and may be selected for inclusion in the new document. The new document may be saved after the reusable structured objects and the reusable unstructured objects are included.

Embodiments and examples are described above, and those skilled in the art will be able to make various modifications to the described embodiments and examples without departing from the scope of the embodiments and examples.

What is claimed is:

1. A machine learning classifier system comprising:
a data set processing subsystem to:
receive data objects from a plurality of data sources, and
execute format and translation operations on the received data objects;
a data repository to store the received data objects; and
at least one processor to:
determine, based on at least one unsupervised machine learning function, a semantic space comprising a representation of the received data objects, wherein the representation of the received data objects is determined from attributes of the received data objects and similarities of the attributes of the received data objects;
receive a query including search terms;
search the semantic space based on the search terms to determine an initial data set of data objects matching the query;
determine at least one relationship between the initial data set of data objects and terms contained in the initial data set of data objects, wherein the determined at least one relationship reveals at least one latent concept related to the initial data set of data objects;
search, based on the determined at least one relationship, the initial data set of data objects to identify reusable structured objects from the initial data set of data objects;
generate at least one machine learning classifier through a supervised machine learning function trained from a training set with a plurality of sentences having a list of words and labels, wherein each of the labels indicates a category to which each of the plurality of sentences belongs;
generate, based on the at least one generated machine learning classifier, at least one category associated with at least one of the identified reusable structured objects to classify information;
classify, by the at least one machine learning classifier, the initial data set of data objects to determine reusable unstructured objects associated with the at least one generated category associated with the at least one of the identified reusable structured objects; and
generate a new data object from at least one of the identified reusable structured objects and at least one of the reusable unstructured objects associated with the at least one category.

2. The machine learning classifier system of claim 1, wherein the received data objects comprise documents, and the attributes of the received data objects comprise terms in the documents.

3. The machine learning classifier system of claim 2, wherein to determine the semantic space comprises:
determine a term-document matrix, wherein each row of the term-document matrix represents a term from the terms in the documents and each column of the term-document matrix represents at least one of the documents containing the term;
singular value decompose the term-document matrix to determine a singular values matrix including singular values from the term-document matrix; and
generate the semantic space from a subset of the singular values.

4. The machine learning classifier system of claim 3, wherein to search the semantic space comprises:
using the search terms to identify, from the semantic space, documents for the initial data set of data objects.

5. The machine learning classifier system of claim 3, wherein the identified reusable structured objects comprise fields of the documents, and a subset of the reusable unstructured objects associated with the at least one category comprise unstructured text from the documents.

6. The machine learning classifier system of claim 1, wherein the new data object comprises a new document.

7. A document generator computer comprising:
at least one memory to store machine readable instructions; and
at least one processor to execute the machine readable instructions to:
determine, based on at least one unsupervised machine learning function, a representation of documents stored in a data repository, wherein the representation of the documents is determined from terms in the documents;
receive a query including search terms;
search the representation of the documents based on the search terms to determine an initial data set of documents matching the query;
determine at least one relationship between the initial data set of documents and terms contained in the initial data set of documents, wherein the determined at least one relationship reveals at least one latent concept related to the initial data set of documents;
search, based on the determined at least one relationship, the initial data set of documents to identify reusable structured objects from the initial data set of documents;
generate at least one machine learning classifier through a supervised machine learning function trained from a training set with a plurality of sentences having a list of words and labels, wherein each of the labels indicates a category to which each of the plurality of sentences belongs;
generate, based on the at least one generated machine learning classifier, at least one category associated with at least one of the identified reusable structured objects to classify information;
determine reusable unstructured objects associated with the at least one generated category associated with the at least one of the identified reusable structured objects based on classifying the initial data set of documents; and
generate a new document from at least one of the identified reusable structured objects and at least one of the reusable unstructured objects associated with the at least one category.

8. The document generator computer of claim 7, wherein the identified reusable structured objects comprise fields from the initial data set of documents.

9. The document generator computer of claim 8, wherein the reusable unstructured objects associated with the at least one category comprise text included in the initial data set of documents, wherein the text is associated with the at least one category.

10. The document generator computer of claim 7, wherein to generate a new document from at least one of the identified reusable structured objects and at least one of the reusable unstructured objects associated with the at least one category comprises:
present the identified reusable structured objects and the determined reusable unstructured objects associated with the at least one category in a graphical user interface;
receive user selections, via the graphical user interface, of the at least one of the identified reusable structured objects and the at least one of the reusable unstructured objects associated with the at least one category; and
generate the new document from the selected at least one of the identified reusable structured objects and the selected at least one of the reusable unstructured objects associated with the at least one category.

11. The document generator computer of claim 7, wherein the representation of documents comprises a semantic space, and to determine the semantic space, the at least one processor is to:
determine a term-document matrix, wherein each row of the term-document matrix represents a term from a document in the data repository and each column of the term-document matrix represents at least one of the documents stored in the data repository containing the term;
singular value decompose the term-document matrix to determine a singular values matrix including singular values from the term-document matrix; and
generate the semantic space from a subset of the singular values.

12. The document generator computer of claim 11, wherein to search the representation of documents comprises:
using the search terms to identify, from the semantic space, documents for the initial data set of documents.

13. A computer-implemented method comprising:
determining a semantic representation of documents stored in a data repository, wherein the semantic representation of the documents is determined from terms in the documents;
receiving a query including search terms;
searching the semantic representation of the documents based on the search terms to determine an initial data set of documents matching the query;
determine at least one relationship between the initial data set of documents and terms contained in the initial data set of documents, wherein the determined at least one relationship reveals at least one latent concept related to the initial data set of documents;
searching, based on the determined at least one relationship, the initial data set of documents to identify reusable structured objects from the initial data set of documents;

generating at least one machine learning classifier through a supervised machine learning function trained from a training set with a plurality of sentences having a list of words and labels, wherein each of the labels indicates a category to which each of the plurality of sentences belongs;

generating, based on the at least one generated machine learning classifier, at least one category associated with at least one of the identified reusable structured objects to classify information;

determining reusable unstructured objects associated with the at least one generated category associated with the at least one of the identified reusable structured objects based on classifying the initial data set of documents; and generating a new document from at least one of the identified reusable structured objects and at least one of the reusable unstructured objects associated with the at least one category.

14. The computer-implemented method of claim 13, wherein the identified reusable structured objects comprise fields from the initial data set of documents, and the reusable unstructured objects associated with the at least one category comprise text included in the initial data set of documents, wherein the text is associated with the at least one category.

15. The computer-implemented method of claim 13, wherein generating a new document comprises:

presenting the identified reusable structured objects and the determined reusable unstructured objects associated with the at least one category in a graphical user interface;

receiving user selections, via the graphical user interface, of the at least one of the identified reusable structured objects and the at least one of the reusable unstructured objects associated with the at least one category; and generating the new document from the selected at least one of the identified reusable structured objects and the selected at least one of the reusable unstructured objects associated with the at least one category.

* * * * *